United States Patent
Abe et al.

(10) Patent No.: US 7,785,407 B2
(45) Date of Patent: Aug. 31, 2010

(54) EVAPORATED FUEL GAS ADSORBENT, EVAPORATED FUEL GAS TRAPPING APPARATUS, ACTIVE CARBON AND PROCESS FOR PRODUCING THE SAME

(75) Inventors: Susumu Abe, Bizen (JP); Shizuo Ishimura, Bizen (JP); Takanori Kitamura, Bizen (JP); Yoshifumi Egawa, Bizen (JP); Akira Miyake, Osaka (JP); Takayuki Yamada, Bizen (JP); Tetsuya Hanamoto, Bizen (JP)

(73) Assignee: Kuraray Chemical Co., Ltd., Bizen-shi (JP)

( * ) Notice: Subject to any disclaimer, the term of this patent is extended or adjusted under 35 U.S.C. 154(b) by 415 days.

(21) Appl. No.: 11/573,989

(22) PCT Filed: Aug. 25, 2005

(86) PCT No.: PCT/JP2005/015437
§ 371 (c)(1),
(2), (4) Date: Nov. 9, 2007

(87) PCT Pub. No.: WO2006/022329
PCT Pub. Date: Mar. 2, 2006

(65) Prior Publication Data
US 2009/0038477 A1    Feb. 12, 2009

(30) Foreign Application Priority Data
Aug. 26, 2004  (JP)  ............................ 2004-246442
Feb. 2, 2005   (JP)  ............................ 2005-025887

(51) Int. Cl.
*F02M 25/08*   (2006.01)
*B01J 20/20*   (2006.01)
*B01D 53/04*   (2006.01)

(52) U.S. Cl. ........................................ 96/153; 502/416

(58) Field of Classification Search .................. 96/146, 96/108, 147, 153; 95/146, 902; 502/416, 502/514; 123/518–520
See application file for complete search history.

(56) References Cited

U.S. PATENT DOCUMENTS 4,869,739 A * 9/1989 Kanome et al. ................ 96/153

(Continued)

FOREIGN PATENT DOCUMENTS

JP    63 57351    4/1988

(Continued)

OTHER PUBLICATIONS

Machine translation of JP 2003-147369 A, published May 21, 2003.*

(Continued)

*Primary Examiner*—Frank M Lawrence
(74) *Attorney, Agent, or Firm*—Oblon, Spivak, McClelland, Maier & Neustadt, L.L.P.

(57) ABSTRACT

The present invention provides an evaporated fuel gas adsorbent, an evaporated fuel gas trapping apparatus that uses the adsorbent, an activated carbon, and a process for producing the activated carbon. The evaporated fuel gas adsorbent is capable of improving adsorptivity and desorptivity by reliably preventing a temperature rise and a temperature fall caused by heat generated in response to the adsorption and desorption of evaporated fuel gas, is capable of achieving a size reduction of the device, and is capable of being easily produced. The activated carbon has high mechanical strength and high abrasive resistance, has many pores suitable to adsorb an organic solvent, especially, evaporated fuel gas, and has a high packing density. The activated-carbon producing process is industrially advantageous.

17 Claims, 7 Drawing Sheets

U.S. PATENT DOCUMENTS

| | | | |
|---|---|---|---|
| 5,861,050 A * | 1/1999 | Pittel et al. | 95/115 |
| 6,503,301 B2 * | 1/2003 | Uchino et al. | 96/132 |
| 7,323,041 B2 * | 1/2008 | Yoshida et al. | 96/132 |
| 7,488,376 B2 * | 2/2009 | Kim et al. | 96/134 |
| 7,543,574 B2 * | 6/2009 | Yamazaki et al. | 123/519 |
| 2001/0020418 A1 * | 9/2001 | Yamafuji et al. | 96/130 |
| 2005/0247202 A1 * | 11/2005 | Seki | 96/146 |
| 2008/0302245 A1 * | 12/2008 | Yoshida et al. | 96/146 |

FOREIGN PATENT DOCUMENTS

| | | |
|---|---|---|
| JP | 8 333110 | 12/1996 |
| JP | 2002 53314 | 2/2002 |
| JP | 2003 147369 | 5/2003 |
| WO | 02 093666 | 11/2002 |
| WO | 03 106833 | 12/2003 |

OTHER PUBLICATIONS

U.S. Appl. No. 11/572,195, filed Jan. 16 2007, Egawa et al.

* cited by examiner

EVAPORATED FUEL GAS ADSORBENT, EVAPORATED FUEL GAS TRAPPING APPARATUS, ACTIVE CARBON AND PROCESS FOR PRODUCING THE SAME

This application is a 371 of PCT/JP05/15437, filed Aug. 25, 2005.

BACKGROUND OF THE INVENTION

1. Field of the Invention

The present invention relates to an evaporated fuel gas adsorbent an evaporated fuel gas trapping apparatus, activated carbon (also termed "active carbon"), and a process for producing the activated carbon. More particularly, the present invention relates to an evaporated fuel gas adsorbent which comprises latent heat storage mediums including containers each of which is made of a flexible film and in each of which a substance that absorbs or releases heat in response to a phase change, relates to an evaporated fuel gas trapping apparatus using the evaporated fuel gas adsorbent, relates to an activated carbon suitable for the evaporated fuel gas adsorbent, that is 1000 to 2500 $m^2/g$ in the specific surface area calculated by the BET method (multipoint method), that is 120 $cm^{-1}$ or less in the half-value width of a D-band peak in the vicinity of 1360 $cm^{-1}$ in Raman spectroscopic analysis, and that is 100 $cm^{-1}$ or less in the half-value width of a G-band peak in the vicinity of 1580 $cm^{-1}$ in Raman spectroscopic analysis, and relates to a process for producing the activated carbon.

2. Description of the Related Art

Activated carbon has excellent adsorbability and hence has been conventionally and widely used to achieve various purposes of use, such as removal of a bad smell, removal of impurities in a liquid, and collection or removal of solvent vapors. In recent years, an issue concerning automobile exhaust emissions and a measure for an improvement in gas mileage have been highlighted, and, from the viewpoint of global environmental protection, various pollution-prevention plans have been carried out for the operations of vehicles. As part of such measures, a porous adsorptive material, such as activated carbon, has been used as an evaporated fuel gas adsorbent. In more detail, a general-purpose vehicle is equipped with an evaporated-fuel-gas processing apparatus in which activated carbon is allowed to adsorb evaporated fuel gas generated from a fuel retaining chamber, such as a fuel tank or a float chamber of a vaporizer, during the traveling and stopping of the vehicle, and then the adsorbed evaporated fuel gas is desorbed by external air drawn thereinto during the traveling of the vehicle, and is sent to an engine intake pipe for combustion treatment.

This evaporated-fuel-gas processing apparatus is called a "canister", in which a gasoline vapor evaporated from a fuel tank is adsorbed by an adsorptive material, the adsorbed gasoline vapor is then desorbed by external air drawn thereinto during the running of an engine, and the desorbed gasoline vapor is introduced into an engine intake manifold, and is burnt in the engine.

However, the conventional canister has the following essential problems. In detail, the adsorbability of an adsorptive material that adsorbs evaporated fuel gas is improved in proportion to a fall in temperature of the adsorptive material, whereas the desorbability of the evaporated fuel gas from the adsorptive material is increased in proportion to a rise in temperature of the adsorptive material. However, since the adsorption of evaporated fuel gas to an adsorptive material is based on an exothermic reaction, the temperature of the adsorptive material is increased in accordance with the adsorption of the evaporated fuel gas, so that the adsorptivity exhibits a falling tendency. On the other hand, since the desorption of evaporated fuel gas from an adsorptive material is based on an endothermic reaction, the temperature of the adsorptive material is decreased in accordance with the desorption of the evaporated fuel gas, so that the desorptivity exhibits a falling tendency. Thus, if the adsorptive material is used to adsorb evaporated fuel gas in unchanged form, the adsorptivity and desorptivity of the adsorptive material cannot be fully displayed owing to the above-mentioned conflicting actions during adsorption and desorption. This is inefficient.

To improve the performance of a canister, various developments have been advanced up to now. Roughly, two developments can be mentioned, one of which has been advanced while being focused on an adsorptive material superior in the adsorption and desorption of the vapor evaporated from a liquid fuel vapor and the other of which has been advanced while being focused on an apparatus taking consideration of thermal efficiency. In general, an activated carbon, derived from coconut shell carbon, wood-based carbon, or coal and the like, or a shaped activated carbon produced by molding activated carbon is used as the adsorptive material. For example, a shaped activated carbon produced by adding short fibers to granular activated carbon and then molding the resulting mixture together with an emulsion serving as a binder is known as an adsorptive material (see Patent document 1: Japanese Published Examined Patent Application No. S48-7194).

An activated carbon modified by oxidation treatment is also known, and is described as being excellent especially for a vehicular canister using a mixed vapor of gasoline and alcohol (see Patent Document 2: Japanese Published Examined Patent Application No. H1-52324). Additionally, it is known to use two kinds of activated carbons differing in average packing density as an activated carbon superior in the adsorption of evaporated fuel gas and in manufacturing costs (see Patent Document 3: Japanese Published Examined Utility Model Application No. H5-17411).

A shaped activated carbon improved in mechanical strength and in abrasive resistance is also known. The following are examples thereof: i.e., a shaped activated carbon produced by pulverizing lignocellulose-based granular activated carbon, then mixing the resulting powder with bentonite clay, then extruding the resulting mixture, then dehydrating and drying the resulting pellets, and subjecting the pellets to thermal treatment (see Patent Document 4: Japanese Published Unexamined Patent Application No. H9-249409); a shaped activated carbon produced by pulverizing lignocellulose-based granular activated carbon, then mixing the resulting powder with an organic binder, then extruding the resulting mixture, then dehydrating and drying the resulting pellets, and subjecting the pellets to thermal treatment (see Patent Document 5: Japanese Published Unexamined Patent Application No. H10-203811); and a molded activated carbon specified by a butane working capacity and an abrasion rate (see Patent Document 6: Japanese Published Unexamined Patent Application No. 2000-313611).

In recent years, canisters have been required to be reduced in size and weight. To meet this requirement there is a need to optimize pores of an adsorptive material so as to improve the performance per volume. When the conventional techniques are seen from this viewpoint, the activated carbon or the shaped activated carbon described in Patent Documents 1 to 3 mentioned above cannot fully satisfy the requirement.

Each of Patent Documents 4 and 5 mentioned above discloses a technique concerning the shaped activated carbon produced by pulverizing wood-based activated carbon then extruding the resulting powder while adding a binder thereto, and calcining the resulting pellets. The thus-produced shaped activated carbon can be improved in mechanical strength and in abrasive resistance, but has difficulty in showing its sufficient performance because the pores are closed with the binder. The same applies to the molded activated carbon disclosed by Patent Document 6.

Activated carbon is also known which has been developed paying attention to the pore size distribution of the activated carbon in order to efficiently trap evaporated fuel. As examples thereof, the following are known: i.e., a fuel-evaporation preventing medium that consists of fibrous activated carbon having a specific pore distribution (see Patent Document 7: Japanese Published Examined Patent Application No. S61-55611); a method for improving the pore distribution of activated carbon by adjusting the concentration of oxygen in a heat treatment process (see Patent Document 8: Japanese Published Unexamined Patent Application No. H6-127912); and a granular evaporated-fuel adsorbing agent that has pores of 50% by weight or more within the range of a pore diameter of 1.4 to 2.8 nm and that has a pore volume of 0.3 mL or more per milliliter (mL) of the adsorbing agent (see Patent Document 9: Japanese Published Unexamined Patent Application No. 2003-314387).

The fibrous activated carbon disclosed by Patent Document 7 has only a small number of useless pores and can be regarded as effective in preventing the evaporation of fuel from the viewpoint of contact efficiency. The fibrous activated carbon shows a high performance per weight, but does not necessarily have a satisfactory performance per volume. Additionally, the fibrous activated carbon is expensive, and has difficulty in industrial applicability.

Patent Document 8 proposes a method for improving pore distribution by setting the oxygen concentration during a 200 to 400° C. calcining process at 5% by volume or more and setting the oxygen concentration during a more-than-400° C. calcining process at less than 5% by volume. However, since the reaction between carbon and oxygen is an exothermic reaction, the temperature partially runs away, so that a burning reaction is easily caused. On the other hand, if the temperature is low, the reaction does not easily proceed, and temperature control cannot be easily performed, thus making stable production difficult.

The evaporated-fuel adsorbing agent disclosed by Patent Document 9 is proposed as a substitute for fibrous activated carbon with the aim of withstanding long-term use. However, in detail, the evaporated-fuel adsorbing agent disclosed thereby is obtained by using the effect of expensive graphite powder, and is hardly adequate from the viewpoint of industrial applicability, for example, because the activation speed is unsatisfactory. Additionally, although an adsorptive material using a coal is described as favorable, no disclosure is made about what kind of coal is suitable as the coal.

On the other hand, to solve these problems from the viewpoint of thermal efficiency, there is a method for controlling temperature by flowing a medium, such as water, from the outside. However, if such a medium is flowed from the outside, much time is consumed to control the temperature, which includes that of the inside of the adsorptive material, because the thermal conductivity of the adsorptive material is low although temperature control can be easily performed near the medium. Additionally, equipment used to flow such a medium and a driving utility are required.

An evaporated fuel trapping apparatus is also known in which a solid heat storage material that is greater in specific heat than activated carbon is dispersed into the activated carbon. Metallic materials, various ceramic materials, glass, or inorganic materials are used as the solid heat storage material (see Patent Document 10: Japanese Published Unexamined Patent Application No. S64-36962). However, since the evaporated fuel trapping apparatus disclosed by Patent Document 10 uses sensible heat, a thermal disadvantage arises in comparison with a heat quantity needed to improve adsorption and desorption, and a large amount of solid heat storage materials must be mixed therewith to produce a desired effect. As a result, the ratio of the activated carbon is relatively lowered, and, disadvantageously, a total amount of adsorption is not improved even if the problem of temperature caused during adsorption and desorption is solved.

A latent-heat storage type adsorbent is also known which is composed of an adsorptive material and a heat storage medium including microcapsules in each of which a substance that absorbs or releases latent heat in response to temperature change is encased. This adsorbent is used for a canister (see Patent Document 11: International Publication WO 03/106833 A1). This adsorbent can prevent both a performance decrease caused by the heat incoming and outgoing in accordance with adsorption and desorption, i.e. prevent a temperature rise caused by heat generation during adsorption and a temperature fall caused by heat absorption during desorption. Therefore, presumably, this adsorbent is useful in improving the performance of a canister in which heat comes and goes in response to adsorption and desorption.

The adsorbent including the microcapsules disclosed by Patent Document 11 uses a substance that absorbs or releases latent heat in response to temperature change as a heat storage material, and hence an advantageous effect is expected to be achieved by mixing a small amount of heat storage material. However, even if the adsorptive material and a liquid in which the microcapsules have been dispersed are equally mixed together and are dried, practical problems will arise. For example, pores of the adsorptive material will be closed when the adsorbent is used, thereby lowering its adsorptivity. Additionally, for example, vibrations will cause a separation between the microcapsule encasing the heat storage material and the adsorptive material, thereby making it impossible to fulfill its proper heat-absorbing-and-generating capabilities.

Patent Document 11 also proposes a method for mixing an adsorptive material and microcapsules in each of which a powdery heat storage material is encased together and then compressing the resulting mixture into molded pieces. This method seems to be effective from the viewpoint of heat transfer efficiency, because the heat storage material and the adsorptive material come into close contact with each other. However, the process of compressing the mixture into molded pieces, which is a complex process, is needed, and there is a fear that the microcapsule will be destroyed during the compressing process, and the phase-change substance will leak out therefrom. Therefore, it is necessary to lower molding pressure and perform molding so as not to destroy the microcapsule. As a result, although the problem of temperature caused during adsorption and desorption is solved, the amount of activated carbon per unit volume is decreased, and hence the total amount of adsorption remains without being increased.

SUMMARY OF THE INVENTION

It is therefore a first object of the present invention to provide an evaporated fuel gas adsorbent that is capable of reliably preventing both a temperature rise and a temperature fall caused by heat generated in accordance with the adsorption and desorption of evaporated fuel gas and, accordingly, improving the adsorptivity and desorptivity, that is capable of being made more compact, and that is capable of being easily produced. It is a second object of the present invention to provide an evaporated fuel gas trapping apparatus that uses this evaporated fuel gas adsorbent. It is a third object of the present invention to provide an activated carbon that is superior in mechanical strength and in abrasive resistance, that has many pores suitable to adsorb an organic solvent, especially evaporated fuel gas, and that has a high packing density. It is a fourth object of the present invention to provide a process for producing the activated carbon industrially advantageously.

To achieve the objects, the present inventors have diligently researched from the viewpoint that a temperature change of an adsorptive material caused by the inflow and outflow of adsorption and desorption heat will be prevented if a substance that absorbs or releases heat in response to a phase change (hereinafter, this substance is abbreviated as a "latent-heat storage material") and activated carbon can be packed into a device at high density in a state of having excellent contact efficiency. As a result unexpectedly, the present inventors have found that the objects can be achieved by employing a simple and low-cost structure in which a latent heat storage medium including flexible-film-made containers in each of which a latent-heat storage material is encased is used together with an adsorptive material, and have reached the present invention. In other words, the present invention is an evaporated fuel gas adsorbent composed of an adsorptive material and a latent heat storage medium including flexible-film-made containers in each of which a latent-heat storage material is encased. Further, the present invention is an evaporated fuel gas trapping apparatus that has this adsorbent.

The present inventors also have repeatedly made a detailed examination paying attention to the specific surface area of activated carbon, to the pore volume in a specific pore diameter, and to the half-value width of a G-band peak and the half-value width of a D-band peak of a specific wavelength in a Raman spectroscopic analysis. As a result, the present inventors have found activated carbon suitable to adsorb evaporated fuel gas. That is, the present invention is an activated carbon characterized in that, in a nitrogen adsorption isotherm determined from the amount of nitrogen adsorbed at liquid nitrogen temperature, the specific surface area calculated according to the BET method (i.e., multipoint method) is 1000 to 2500 $m^2/g$, the half-value width of a D-band peak in the vicinity of 1360 $cm^{-1}$ in the Raman spectroscopic analysis is 120 $cm^{-1}$ or less, and the half-value width of a G-band peak in the vicinity of 1580 $cm^{-1}$ in the Raman spectroscopic analysis is 100 $cm^{-1}$ or less. Further, the present invention is a process for producing an activated carbon that activates, by use of gas, carbonized material whose ash content is 4% by weight or less obtained by carbonizing a carbonaceous material.

According to the evaporated fuel gas adsorbent of the present invention, since a latent-heat storage material is used in a state of being encased in a flexible-film-made container, the whole of the container can be plastically deformed, and the container can be efficiently brought into contact with an adsorptive material participating in the adsorption and desorption of evaporated fuel gas. Therefore, heat caused by the adsorption and desorption thereof can be effectively controlled. Additionally, since the latent-heat storage material can be highly densely packed into the container in solid or liquid form, the limited volume can be effectively utilized, and a device including the latent heat storage material can be made more compact. Additionally, since the activated carbon of the present invention is superior in the adsorptivity of an organic solvent vapor, especially of evaporated fuel gas, and has both high packing density and high mechanical strength, the activated carbon is suitable for use in a solvent recovery device or in a canister. Additionally, according to the activated-carbon producing process of the present invention, the activated carbon characterized as above can be produced industrially advantageously.

DETAILED DESCRIPTION OF THE PREFERRED EMBODIMENTS

Figure 1:
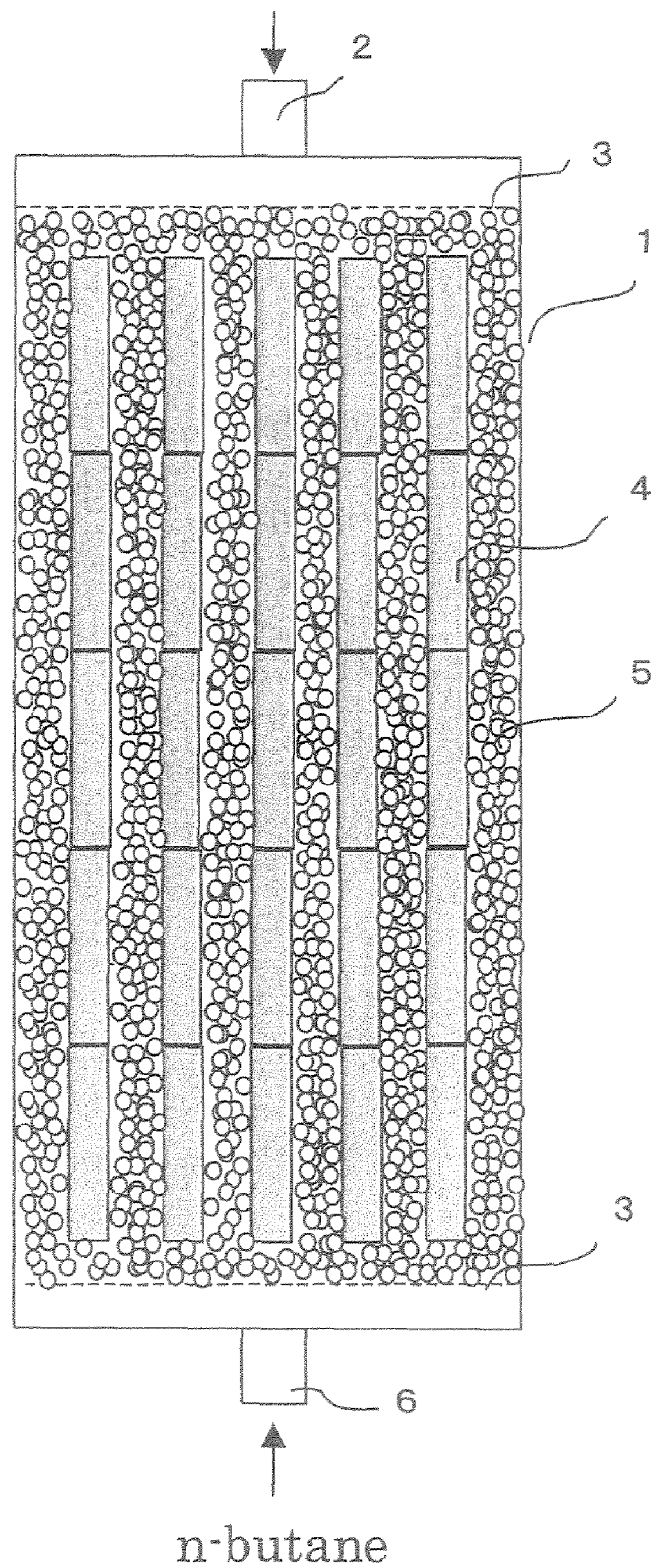
FIG. 1 is a schematic view (front view) of an evaporated fuel gas trapping apparatus in which an adsorptive material and flat-plate-shaped latent heat storage mediums are combined together.

An evaporated fuel gas adsorbent of the present invention comprises an adsorptive material and latent heat storage mediums including containers each of which is made of a flexible film and in each of which a latent-heat storage material that absorbs or releases heat in response to a phase change is encased. Preferably, from the viewpoint of energy efficiency, an organic compound or an inorganic compound that exhibits a phase change in a range of −10° C. to 100° C., more preferably 20° C. to 70° C., is used as the latent-heat storage material. In other words, preferably, an organic compound or an inorganic compound that has such a melting point is used as the latent-heat storage material.

Examples of the organic compound include a hydrocarbon compound, such as decane, dodecane, tetradecane, pentadecane, hexadecane, octadecane, eicosane, or paraffin; higher alcohol, such as lauryl alcohol, myristyl alcohol, palmityl alcohol, stearyl alcohol, eicosanol, ceryl alcohol, or myricyl alcohol, higher fatty acid, such as lauric acid, myristic acid palmitic acid, stearic acid, oleic acid, or behenic acid; glyceride of higher fatty acid; amides, such as propion amide; polyethylene glycol, such as PEG 400, PEG 600, PEG 1000, PEG 2000, PEG 4000, or PEG 6000; phenols, such as phenol or cresol; and amines, such as ethylenediamine.

Examples of the inorganic compound include inorganic salts, such as calcium chloride, sodium acetate, sodium carbonate, potassium hydrogencarbonate, potassium chloride, ammonium chloride, sodium chloride, or sodium sulfide; hydrates of inorganic salts, salts, such as carboxylate; and a mixture of these elements.

In consideration of the temperature, the thermal stability, the heat capacity, etc., of a canister, hydrocarbon compounds, higher alcohols, and higher fatty acids are especially suitable as examples of the latent-heat storage material. Examples of the hydrocarbon compounds include hexadecane, octadecane, eicosane, and paraffin. Examples of the higher alcohols include lauryl alcohol, myristyl alcohol, palmityl alcohol, and stearyl alcohol. Examples of the higher fatty acids include lauric acid, myristic acid, palmitic acid, and stearic acid. The latent-heat storage material is required to absorb or release a practically sufficient amount of heat. Therefore, preferably, the latent-heat storage material has a latent heat of fusion of 20 mJ/mg or more, and more preferably 50 mJ/mg or more.

To prevent the latent-heat storage material from exhibiting a supercooling phenomenon the latent-heat storage material may be allowed to contain a compound having a higher melting point than that of the latent-heat storage material. Preferably, the content ratio of such a high-melting compound is 0.5 to 30% by weight with respect to the latent-heat storage material that exhibits a phase change, and more preferably 1 to 15% by weight. Examples of the high-melting compound include aliphatic hydrocarbon compounds, aromatic compounds, esters, carboxylic acids, alcohols, and amides.

Concrete examples of a combination between the latent-heat storage material and the high-melting compound are as follows. If octadecane is used as the latent-heat storage material, examples of the high-melting compound suitable to be mixed include palmityl alcohol, stearyl alcohol, eicosanol, myristic acid, behenic acid, stearyl acid amide, and ethylenebis oleic acid. These high-melting compounds may be used as a mixture consisting of at least two of the compounds.

Fine particles of inorganic compounds, such as talc, silica, titanium dioxide, silicate calcium, or antimony trioxide, or fine particles of organic acid salts, such as magnesium stearate or sodium benzoate, can be mentioned as substances other than those mentioned above which are allowed to be added to prevent the latent-heat storage material from exhibiting a supercooling phenomenon.

A most prominent feature in the evaporated fuel gas adsorbent of the present invention is to use a latent heat storage medium that a latent-heat storage material is encased in a flexible-film-made container. The term "flexible film" mentioned in the present invention denotes a film that easily undergoes plastic deformation by the application of a slight external force. For example, the "flexible film" is a film made of paper materials organic polymeric materials, metallic materials or composites composed of polymeric materials and metallic materials. Preferably from the viewpoint of strength, a film made of organic polymeric materials, metallic materials, or composites composed of polymeric materials and metallic materials is used as the flexible film.

Examples of the organic polymeric materials include polyolefin such as polyethylene (PE) or polypropylene (PP); polyamide, such as nylon-6 nylon-66 or nylon 12; polyester such as PET or PBT; polyvinyl alcohol, such as vinylon or EVAL which is a trade name; polyurethane resin; epoxy resin; melamine resin; and polyvinyl chloride (PVC). Examples of the metallic materials include aluminum copper iron stainless steel lead and magnesium.

A composite composed of the organic polymeric materials and the metallic materials mentioned above can be cited as an example of the composites mentioned above. Especially, from the viewpoint of flexibility, thermal conductivity, heat resistance, gas barrier properties, weather resistance, low-temperature resistance, and industrial productivity, a film having a laminated structure including an aluminum film (Al) is desirable for the composite A five-layer laminate film including an Al-made innermost layer, a PE-made interlayer, and a PET-made outermost layer or a laminate film including a PET layer on which aluminum has been deposited, a PE layer, and a nylon layer can be mentioned as a concrete example of the film. These are superior also in sealability.

In the present invention the container in which a latent-heat storage material is encased is made of any one of the above-mentioned films, and is formed in various shapes, such as a bag shape, a rectangular-solid shape, or a spiral shape. Preferably, from the viewpoint that the surface area of the material-packing container can be enlarged, the container is shaped like a flat plate or a fin formed so that the container has a rugged surface. Conventionally, a latent-heat storage material packed in a bag has been used as an industrially applicable one. For example, a latent-heat storage material is encased in a film made of metallic foil, such as aluminum foil or made of resin having gas barrier properties, such as vinylidene chloride, cellophane, polycarbonate, nylon, or unplasticized vinyl chloride. This latent-heat storage material encased in such a film is applied to a heat-storage floor heating apparatus. However, the bag-shaped film used herein is formed in a pressure-reduced enclosed state, and hence is rigid and inflexible. In other words, unlike the film of the present invention, the conventional bag-shaped film is not formed paying attention to a close contact with an adsorptive material, such as activated carbon, so as to improve the performance of the adsorbent that prevents the evaporation of fuel. Therefore, this conventional film gives no consideration to the flexibility of a container, which is the gist of the present invention.

Preferably, a container in which a latent-heat storage material is encased, i.e., a latent heat storage medium has a small thickness of 10 mm or less, and more preferably 5 mm or less, from the viewpoint of an improvement in flexibility, an increase in contact with an adsorptive material, and an improvement in thermal conductivity.

The distance between the latent heat storage mediums is a major factor to improve thermal conductivity and effectively control a heat transfer during the adsorption and desorption of evaporated fuel gas. The distance between the latent heat storage mediums greatly depends on the shape, such as particle diameter of an adsorptive material to be used, and preferably, the amount of activated carbon packed in the container is made as small as possible. In the present invention it is preferable to set the distance between the latent heat storage mediums at 25 mm or less, more preferably 20 mm or less, and even more preferably 10 mm or less.

When a latent-heat storage material is encased in a container, it is preferable to encase the latent-heat storage material therein by the unit of 0.1 to 200 mL because, if the volume of the container is made too small, it will become difficult to produce the container, and, if the volume thereof is made too large, thermal efficiency brought about by the convection of the latent-heat storage material being in a molten state will be reduced. Therefore, preferably, the latent-heat storage material is encased in the container by the unit of 0.1 to 200 ml, more preferably 0.3 to 50 mL, and even more preferably 0.5 to 30 mL. The latent-heat storage material may be used in a state of being mixed with an adsorptive material in the form of a capsule having the above-mentioned unit. The latent-heat storage material encased in the container is repeatedly melted and coagulated under a use condition, and hence absorbs and releases heat. Preferably, the filling rate (also termed the "packing rate") of the latent-heat storage material being in a molten state is set at 95% by volume or less.

No specific limitations are imposed on the adsorptive material used in the present invention, except that the adsorptive material can adsorb and desorb evaporated fuel. Examples of the adsorptive material to be used include activated carbon alumina, activated alumina, silica gel, zeolite, silica alumina, and silica. These may be mixed together. By reason of being superior in adsorptivity and desorptivity, it is preferable to use activated carbon and activated alumina, and particularly, activated carbon.

No specific limitations are imposed on a carbonaceous material that is the raw material of activated carbon if it forms activated carbon by activation. The carbonaceous material can be selected from various categories, i.e., from a plant-based material, a mineral-based material, a natural material, and a synthetic material. In more detail, wood, charcoal, or fruit shells, such as coconut shells, can be mentioned as a plant-based carbonaceous material. Coal, petroleum and/or coal pitch or coke can be mentioned as a mineral-based carbonaceous material. Natural fiber, such as cotton or flax, regenerated fiber, such as rayon or viscose rayon, or semisynthetic fiber, such as acetate or triacetate, can be mentioned as a natural material. Polyamide resin, such as nylon, polyvinyl alcohol resin, such as vinylon, polyacrylonitrile resin, such as acrylic, polyolefin resin, such as polyethylene or polypropylene, polyurethane resin, phenol resin, or polyvinyl chloride resin can be mentioned as a synthetic material. These may be mixed together.

The carbonaceous material has no specific limitations on its shape, and can have various shapes, such as a granular, powdery, fibrous, or sheet-like shape. Preferably, a granular carbonaceous material is used by reason of being easy to deal with. Woven or unwoven cloth, film, felt, or sheet-shaped material including natural cellulose fiber, such as cotton, regenerated cellulose fiber such as viscose rayon or polynosic rayon, pulp fiber, and synthetic fiber, such as polyvinyl alcohol fiber, ethylene vinyl alcohol fiber, or phenol fiber, can be mentioned as a fibrous or sheet-shaped carbonaceous material.

The carbonaceous material is turned into activated carbon by being carbonized and activated. For example, the condition that the carbonaceous material is processed at 300° C. or more while passing a small amount of inert gas through a batch-wise rotary kiln can be employed as the carbonizing condition. It is permissible to use various methods, such as gas activation or agent activation, as the activating method. Preferably, gas activation is employed from the viewpoint of obtaining granular activated carbon that is high in mechanical strength and in packing density. Steam, carbon dioxide, oxygen, LPG exhaust combustion gas, or a mixture of these gases can be mentioned as gas used in the gas activation method. Preferably, the carbonaceous material is activated with gas including a water vapor of 10 to 50% by volume, in consideration of safety and reactivity.

Activation is performed at an activation temperature of 700° C. to 1100° C. To grow pores while maintaining a high activation yield, it is preferable to perform activation as moderately as possible at a temperature-rise rate of 3 to 50° C./hour. It is preferable to employ an activating method in which the temperature is gradually raised from 800° C. to 1000° C. while spending several tens of hours or, alternatively, an activating method in which several tens of hours for activation are spent in the neighborhood of 800° C., and then long hours for activation are spent in the neighborhood of 1000° C. The activation time cannot be uniformly determined and is appropriately set in accordance with a desired specific surface area or a desired pore distribution.

Activated carbon suitable as the adsorbent of the present invention has a specific surface area of 1000 to 2500 $m^2/g$, preferably 1100 to 2000 $m^2/g$, which is calculated according to the BET method (i.e., multipoint method), in a nitrogen adsorption isotherm calculated from a nitrogen adsorption amount at the liquid nitrogen temperature, and is suitably used for a canister.

Preferably, in the thus-formed activated carbon, the half-value width of a D-band peak in the neighborhood of 1360 $cm^{-1}$ in Raman spectroscopy is 120 $cm^{-1}$ or less, and the half-value width of a G-band peak in the neighborhood of 1580 $cm^{-1}$ in Raman spectroscopy is 100 $cm^{-1}$ or less. If the half-value width of a D-band peak in the neighborhood of 1360 $cm^{-1}$ exceeds 120 $cm^{-1}$, and if the half-value width of a G-band peak in the neighborhood of 1580 $cm^{-1}$ is less than 100 $cm^{-1}$, the mechanical strength becomes low, and vibrations will cause cracks in the activated carbon, and hence air-flow resistance will become liable to rise. More preferably, the D-band-peak half-value width is 100 $cm^{-1}$ or less, and the G-band-peak half-value width is 90 $cm^{-1}$ or less.

In general, an adsorption isotherm and a desorption isotherm do not coincide with each other, and form a hysteresis loop. There are various theories about this cause. It is said that a mechanical difference exists between the formation of a meniscus on the adsorption side and the formation of a meniscus on the desorption side, and the liquid phase in pores is not removed to relative pressure lower than that during adsorption. Activated carbon applied to a canister repeatedly performs adsorption and desorption, and desorbability is as important as adsorbability. Therefore it is preferable to have a large pore volume calculated from an isotherm during desorption and have an appropriate pore size distribution.

From this viewpoint preferably, in a nitrogen desorption isotherm calculated from a nitrogen adsorption amount at the liquid nitrogen temperature, the pore volume within a range of 1.9 nm to 4 nm in the pore diameter calculated according to the Cranston-Inkley method (CI method) is 0.6 mL or more, and the entire pore volume is 0.8 mL/g or more, and the specific surface area is 1000 $m^2/g$ or more, because an activated carbon having too small pores is superior in evaporated fuel gas adsorbability and in organic solvent adsorbability, but is liable to become inferior in desorbability of high-boiling components, and, on the other hand, an activated carbon having too large pores is inferior in adsorbability.

Pores having a pore diameter of 50 nm to 1 µm can hardly participate in adsorption, and lower the packing density, and hence are expected to be as small in number as possible. Therefore, in the granular activated carbon of the present invention, preferably, the pore volume of pores having a pore diameter of 50 nm to 1 µm measured by the mercury penetration method is 0.25 mL/g or less. A woody carbonaceous material has a pore diameter of 1 µm or more, which is derived from plant tissues, and hence it is recommended to use a carbonaceous material in which the number of pores having such a large diameter is as small as possible.

The activated carbon of the present invention is used by being packed in an evaporated fuel gas trapping apparatus, such as a canister or a solvent recovery unit. Therefore, preferably, the activated carbon has a high packing density. Generally, adsorbability rises in proportion to an increase in specific surface area. However, the packing density falls in proportion to an increase in specific surface area, and the activated carbon tends to become unable to practically sufficiently exhibit its performance. Therefore, preferably, the packing density of the activated carbon of the present invention is 0.3 g/mL or more.

As described above, a woody carbonaceous material has a pore diameter of 1 µm or more derived from plant tissues. Therefore, although it is recommended to use a carbonaceous material in which the number of pores having such a large diameter is as small as possible if used, it is permissible to plug up such a pore with a carbonaceous material, such as pitch or tar, that also serves as a binder.

It is preferable to use not a plant-based carbonaceous material having many macropores at the stage of the raw material but a mineral-based material or a synthetic material as a carbonaceous material that is the raw material of the activated carbon of the present invention. Preferably, 50% by weight or more of the carbonaceous material consists of a mineral-based material, especially coal. Any kind of coal, such as caking coal non-caking coal semi-anthracite coal, or anthracite coal can be used as the coal. Preferably, non-caking coal or anthracite coal whose fixed carbon content is 70% by weight or more is used.

Without being limited to a specific shape, activated carbon can assume all shapes such as a crushed shape, a pellet-like shape, or a spherical shape. It is permissible to use a mixture obtained by blending activated carbons, which differ in shape, together. In consideration of the fact that the packing density rises, granular activated carbon having a column-like, pellet-like, or spherical shape is desirable. If the particle diameter is too small the packing density will be increased, and the air-flow resistance will rise. Therefore, cases will occur in which practical problems arise. On the other hand, if the particle diameter is too large, a decrease in the packing density will be easily caused, and a gap between particles will be easily produced, and, as a result, a short path of gas will easily arise. Therefore, preferably, the particle diameter is set at about 5 mm to 5 mm.

Preferably, to produce activated carbon, carbide obtained by carbonizing a carbonaceous material so as to have an ash content of 4% by weight or less is activated with gas. If the temperature during the carbonization process is too high, the progress of crystallization will become excessive, thus complicating the activation process. On the other hand, if the temperature during the carbonization process is too low, a volatile matter content will become high resulting from insufficient carbonization, and will be volatilized at one burst when an activation reaction occurs at a high temperature, thus leading to the generation of pores not participating in adsorption or the occurrence of cracks. Therefore, preferably, the carbonization process is performed at a temperature of 500 to 1100° C.

As described above, it is preferable to allow the carbonaceous material to contain a mineral-based material of at least 50% by weight or more, preferably 80% by weight or more. Especially, coal is suitable as the mineral-based material. Preferably, non-caking coal or anthracite coal whose fixed carbon content is 70% by weight or more is used as the coal. The fixed carbon content and the ash content of the coal raw material can be confirmed by being measured according to the industrial analysis method of JIS M 8812 about coals and cokes. A recommended way to select non-caking coal is carried out as follows. According to the crucible-expansion test method of JIS M 8808 6, a sample is put into a given crucible, and is heated under predetermined conditions. Thereafter, the crucible swelling number (button index) resulting from comparison of the resultant residue with a standard outline is measured, thus selecting a coal whose button index is smaller than 1, preferably 0.

The activated carbon whose ash content is as small as possible is preferable to the activated carbon that is high in ash content. A reduction in ash content makes it possible to restrain the phenomenon of a fall in recovery efficiency caused by the decomposition or polymerization of an organic solvent or evaporated fuel gas adsorbed by the catalytic action of an ash content, and makes it possible to restrain an excessive activation reaction so as to accelerate the growth of micropores and to restrain an increase in the number of macropores that do not contribute to adsorption. As a result, durability is improved. Therefore, preferably, in the present invention, the ash content of carbide obtained by carbonizing a carbonaceous material is set at 4% by weight or less. If a carbonaceous material having a large amount of ash contents is used, the carbonaceous material may be subjected to a deashing process, or may be first carbonized and then subjected to a deashing process so as to have an ash content of 4% by weight or less.

The evaporated fuel gas adsorbent of the present invention can be obtained by arranging latent heat storage mediums, which include containers to the shape of which no specific limitations are imposed and in each of which the above-mentioned latent-heat storage material is encased, in an adsorptive material, such as activated carbon. Since the latent heat storage medium has flexibility, contactability with an adsorptive material, such as activated carbon, can be improved, and the adsorptivity of evaporated fuel gas can be greatly improved. If the ratio of the latent heat storage medium to the evaporated fuel gas adsorbent is too low, thermal storage ability will become insufficient. On the other hand, if the ratio of the latent heat storage medium thereto is too high, the adsorptive material is relatively decreased, and the effect of adsorption and desorption will be lowered. Therefore, preferably, the latent heat storage medium is set at 2% by weight to 40% by weight and more preferably 5% by weight to 30% by weight.

Figure 2:
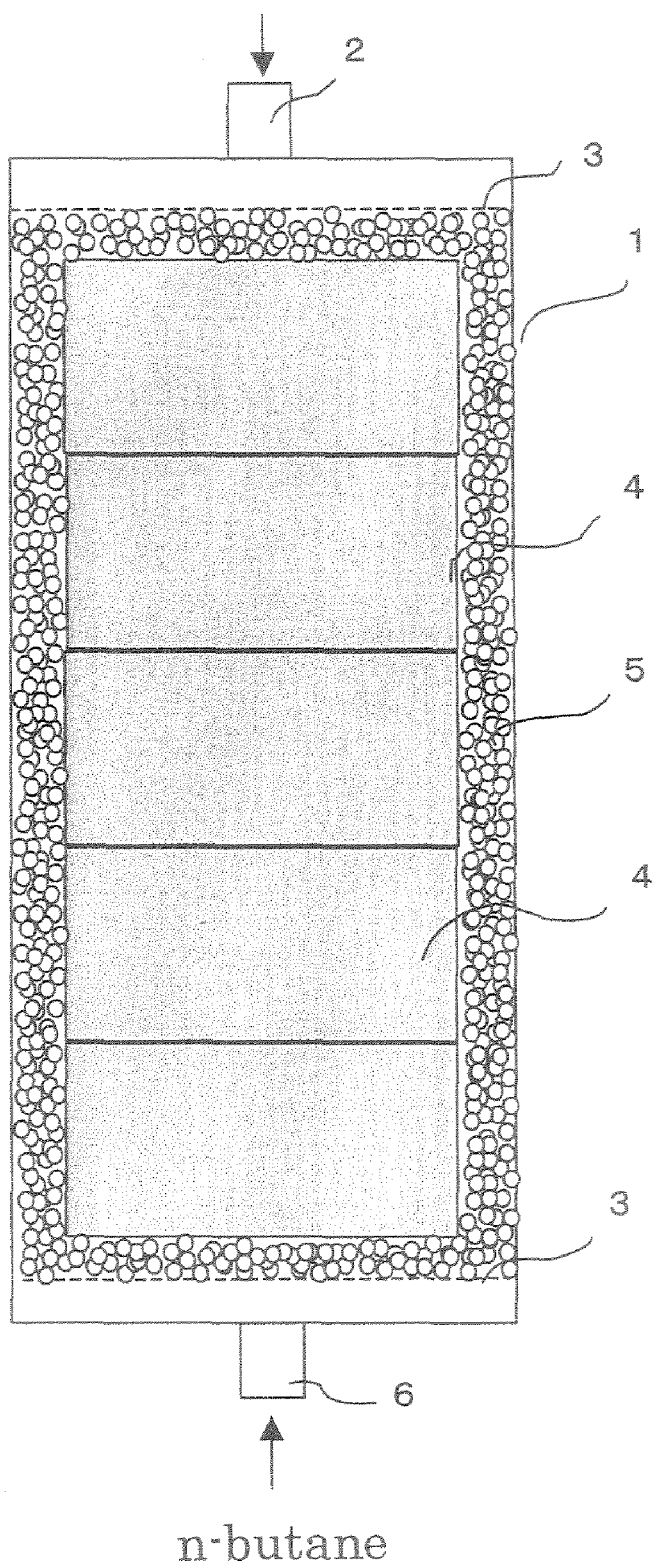
FIG. 2 is a schematic view (side view) of the evaporated fuel gas trapping apparatus of FIG. 1.

FIG. 1 and FIG. 2 show an evaporated fuel gas trapping apparatus that includes containers capable of having various shapes. FIG. 1 is a schematic view (front view) of the evaporated fuel gas trapping apparatus in which an adsorptive material and latent heat storage mediums each of which is shaped like a flat plate are combined together, and FIG. 2 is a side view of the evaporated fuel gas trapping apparatus of FIG. 1. In FIG. 1 and FIG. 2, reference numeral 1 designates the evaporated fuel gas trapping apparatus that uses an evaporated fuel gas adsorbent of the present invention, reference numeral 2 designates an air opening for purging, reference numeral 3 designates a dispersing plate, reference numeral 4 designates a latent heat storage medium, reference numeral 5 designates an adsorptive material, and reference numeral 6 designates an n-butane feed opening used for BWC measurement.

Figure 3:
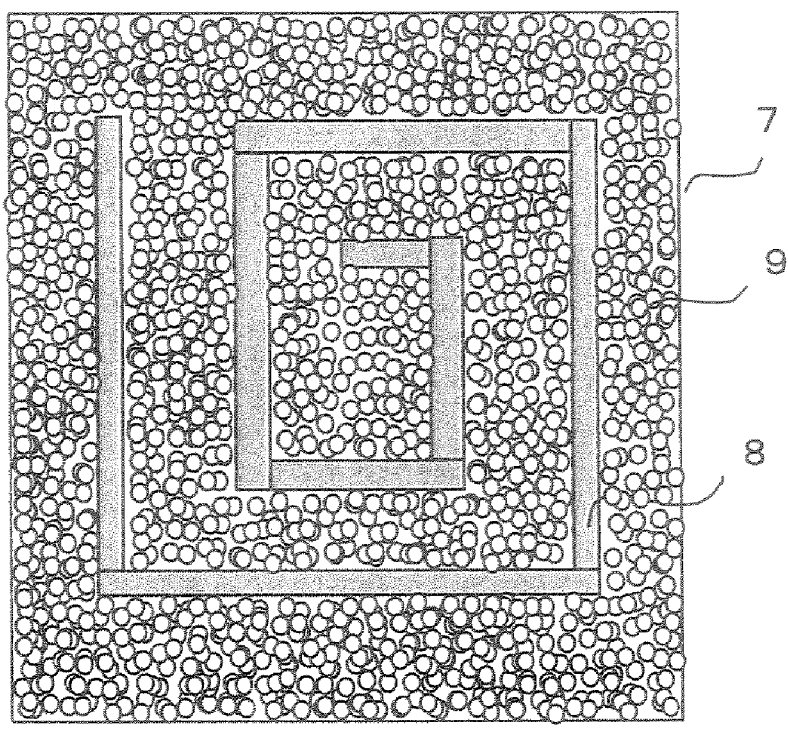
FIG. 3 is a schematic view (plan view) of an evaporated fuel gas trapping apparatus in which an adsorptive material and volute latent heat storage mediums are combined together, seen from the side of an air opening for purging.

FIG. 3 is a schematic view (plan view seen from the side of the air opening for purging) of an evaporated fuel gas trapping apparatus in which an adsorptive material and volute latent heat storage mediums are combined together. In FIG. 3, reference numeral 7 designates the evaporated fuel gas trapping apparatus that uses an evaporated fuel gas adsorbent of the present invention, reference numeral 8 designates a latent heat storage medium, and reference numeral 9 designates an adsorptive material.

Figure 4:
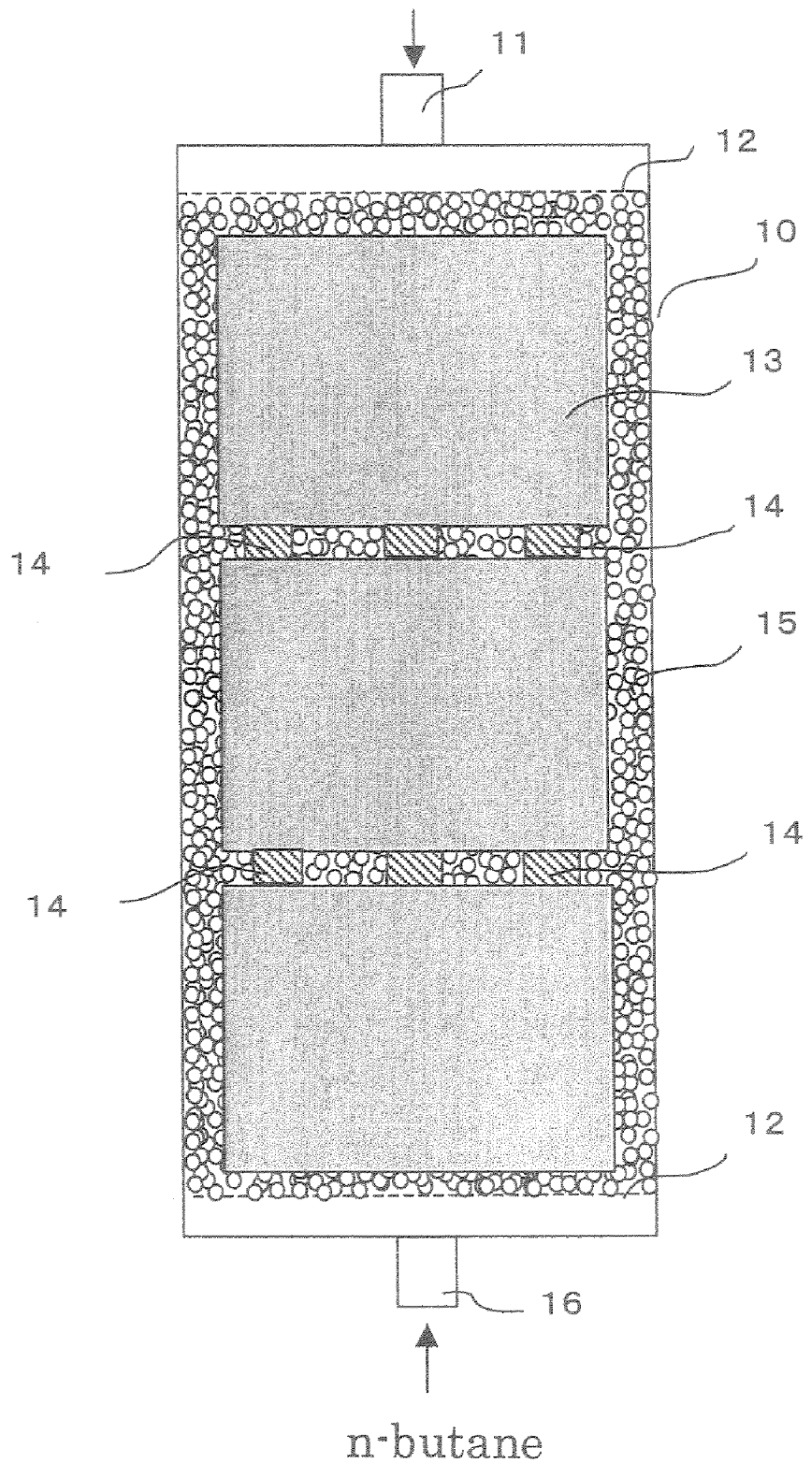
FIG. 4 is a schematic view (front view) of another evaporated fuel gas trapping apparatus.
Figure 5:
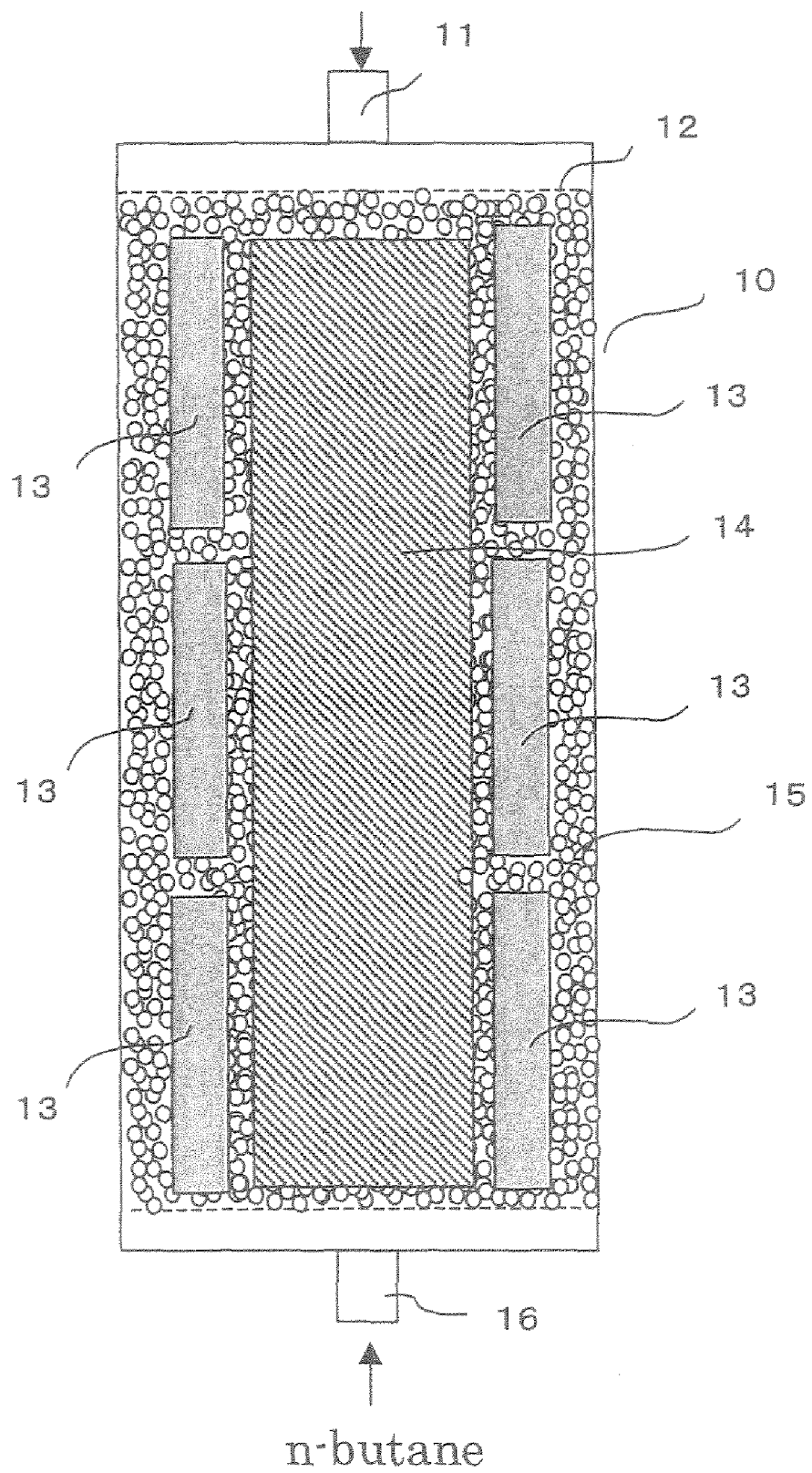
FIG. 5 is a schematic view (side view) of the evaporated fuel gas trapping apparatus of FIG. 4.

FIG. 4 is a schematic view (front view) of another evaporated fuel gas trapping apparatus that uses nine sheets of latent heat storage mediums in total (i.e., three sheets of latent heat storage mediums disposed in one-stage form at the inner side and two sheets of latent heat storage mediums disposed in three-stage form at the outer side). FIG. 5 is a side view of the evaporated fuel gas trapping apparatus of FIG. 4. In FIG. 4 and FIG. 5, reference numeral 10 designates the evaporated fuel gas trapping apparatus that uses an evaporated fuel gas adsorbent of the present invention, reference numeral 11 designates an air opening for purging, reference numeral 12 designates a dispersing plate, reference numerals 13 and 14 designate latent heat storage mediums, reference numeral 15 designates an adsorptive material, and reference numeral 16 designates an n-butane feed opening used for BWC measurement. Although FIG. 1 to FIG. 5 show examples in which the latent heat storage medium is shaped like a flat plate or like a spiral, it is apparent from the gist of the present invention that the latent heat storage medium can have various shapes other than the above-mentioned ones.

Figure 6:
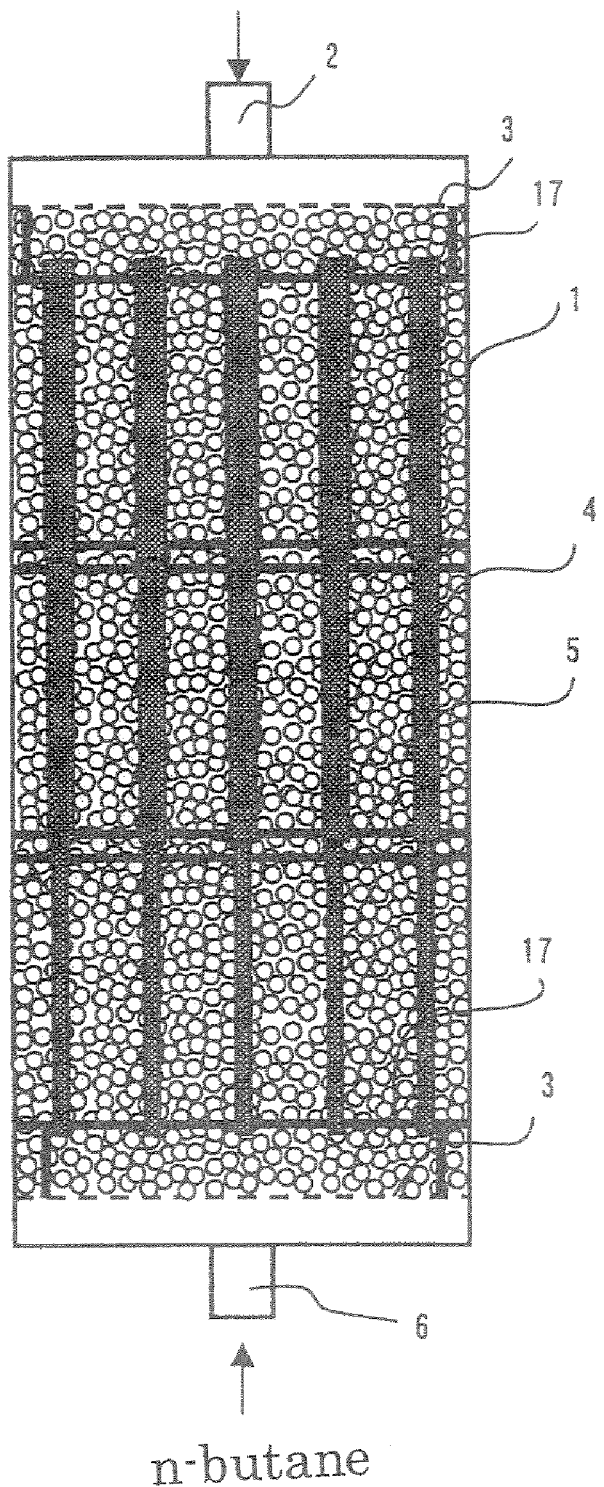
FIG. 6 is a schematic view (front view) of another evaporated fuel gas trapping apparatus.
Figure 7:
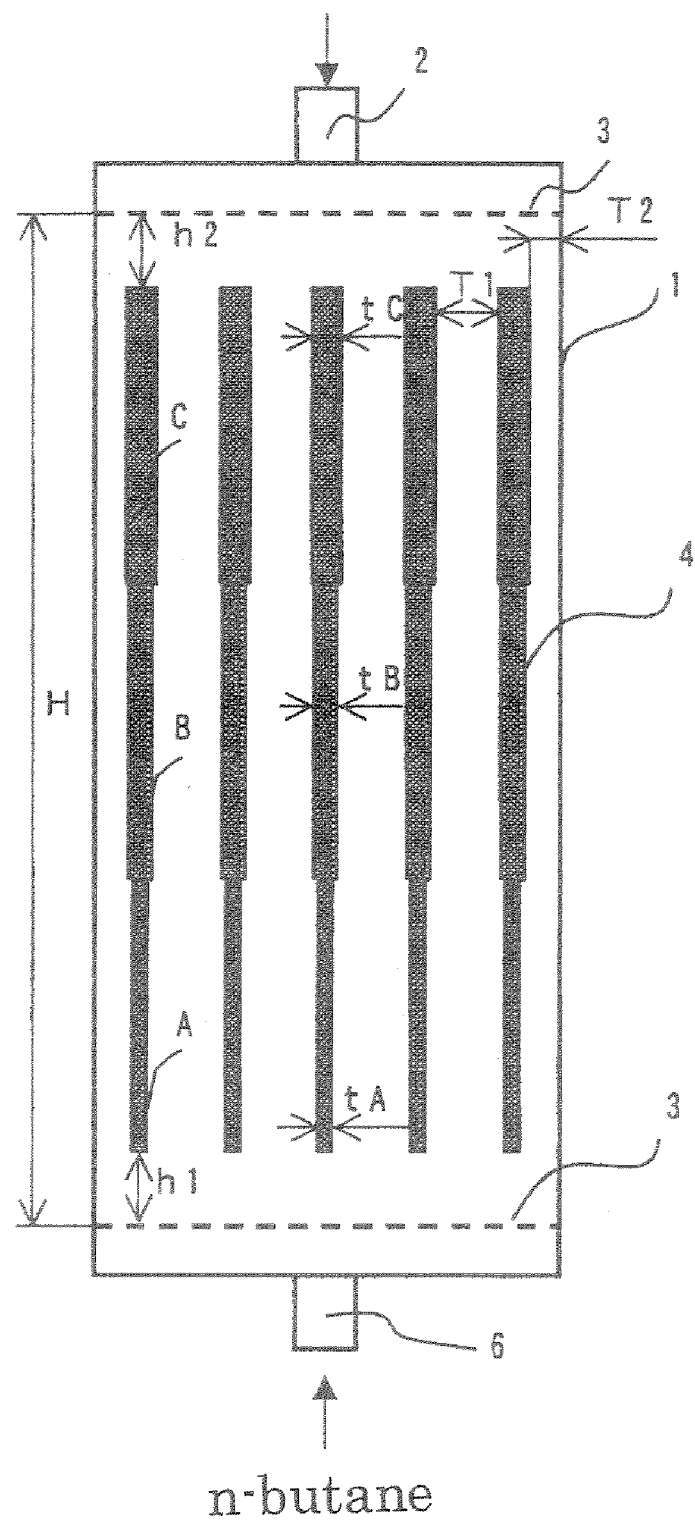
FIG. 7 is a schematic view (side view) of the evaporated fuel gas trapping apparatus of FIG. 6.

The latent heat storage material of the present invention is encased in a cylindrical container whose aspect ratio (L/D ratio) is about 1 to 5 or in a polygonal container whose bottom face is square or rectangular and whose internal volume is about 300 mL to 5 L. An apparatus including these materials and containers is used as an evaporated fuel gas trapping apparatus, such as a canister. Preferably, latent heat storage mediums consisting of the containers are arranged so that optimal heat transfer efficiency can be shown and so that the latent heat storage mediums do not move while a vehicle is traveling. If the bottom of a container is not circular, the depth "D" is set to be four times as long as the equivalent diameter, i.e., the hydraulic mean radius. An example thereof is shown in FIG. 6. Herein, reference numeral 17 designates a supporter by which the latent heat storage medium is fixed and which is made of a corrosion resisting material FIG. 6 and FIG. 7 show an example in which latent heat storage mediums A to C differing in thickness are arranged in three-stage form.

Preferably, to efficiently remove heat generated in the evaporated fuel gas trapping apparatus, and to allow evaporated fuel to evenly flow through the evaporated fuel gas trapping apparatus, the latent heat storage mediums A to C are arranged so as to satisfy the following relational expressions:

$$h_1 > h_2;$$

$$H/50 \leq h_1 \leq H/5;$$

$$0 < h_2 \leq H/10$$

where H is the height of an activated-carbon-filled layer from the side of the n-butane feed opening to the side of the air opening, $h_1$ is the distance from the dispersing plate on the side of the n-butane feed opening to the lowest part of the latent heat storage medium "A", and $h_2$ is the distance from the dispersing plate on the side of the air opening for purging to the uppermost part of the latent heat storage medium "C," as shown in the evaporated fuel gas trapping apparatus of FIG. 7. More preferably, from the viewpoint of preventing a local rise in temperature of the inside of the evaporated fuel gas trapping apparatus, the latent heat storage mediums A to C are arranged so as to satisfy the following relational expressions:

$$h_1 > h_2;$$

$$H/30 \leq h_1 \leq H/8;$$

$$0 < h_2 \leq H/15.$$

Preferably, to efficiently remove heat generated in the evaporated fuel gas trapping apparatus, the number of stages of latent heat storage mediums layered in the evaporated fuel gas trapping apparatus is set at one to five, which is practically advantageous, partly depending on the structure of the evaporated fuel gas trapping apparatus. More preferably, the latent heat storage mediums are layered in two- or three-stage form. Even more preferably in view of the actual capacity of a canister the latent heat storage mediums are layered in three-stage form. FIG. 6 and FIG. 7 show a structure created in three-stage form. No specific limitations are imposed on the height of a latent heat storage medium. For example, in consideration of complexity during production, latent heat storage mediums each of which has the same height may be layered.

In the evaporated fuel gas trapping apparatus, latent heat storage mediums are layered in three-stage form so that each stage has the same height in order of A, B, and C from the side of the n-butane feed opening as shown in FIG. 6 and FIG. 7. Let the thicknesses of the latent heat storage mediums be tA, tB, and tC. Preferably to efficiently remove heat generated in the evaporated fuel gas trapping apparatus, the following relational expression is satisfied:

$$tA < tB \leq tC$$

Preferably tC is 10 mm or less as mentioned above.

Preferably to efficiently remove heat generated in the evaporated fuel gas trapping apparatus while keeping the packing of an adsorptive material in an excellent state, the following relational expression is satisfied:

$$T2 \leq T1$$

where T1 is the distance between the latent heat storage medium A and the latent heat storage medium A or between the latent heat storage medium B and the latent heat storage medium B, or between the latent heat storage medium C and the latent heat storage medium C, and T2 is the distance from the latent heat storage medium A, B, or C to the inner wall of the evaporated fuel gas trapping apparatus.

More preferably, in consideration of heat radiation in the evaporated fuel gas trapping apparatus, the following relational expression is satisfied:

$$0.7 T1 \leq T2 \leq T1$$

Preferably the upper limit of T1 is 25 mm as mentioned above.

Let the melting points of latent-heat storage materials in the latent heat storage mediums A, B, and C arranged in the evaporated fuel gas trapping apparatus be MA, MB, and MC, respectively. In consideration of a temperature distribution during adsorption in the evaporated fuel gas trapping apparatus in order to efficiently remove heat generated in the evaporated fuel gas trapping apparatus, the latent heat storage mediums are arranged so that the melting points of the latent-heat storage materials have the following relational expression:

$$MA < MB < MC$$

As a result, advantageously, heat generated in the evaporated fuel gas trapping apparatus can be efficiently removed. Alternatively, the latent heat storage mediums may be arranged so that the melting points thereof have the following relational expression:

$$MA < MB \leq MC$$

As mentioned above, the melting point of the latent-heat storage material is $-10°$ C. to $100°$ C., more preferably $20°$ C. to $70°$ C. Therefore, conditions, such as $25°$ C. $\leq MA \leq 35°$ C., $35°$ C. $< MB \leq 45°$ C., and $35°$ C. $< MC \leq 55°$ C., are employed. The present invention will be hereinafter described in detail with reference to examples. However, the present invention is not limited to these examples. In the examples, physical properties of granular activated carbon were measured as follows.

Nitrogen adsorption isotherm at liquid nitrogen temperature: BELSORP 28 produced by BEL Japan, Inc., was used for measurement.

Specific surface area by the BET method (multipoint method) and pore volume by the CI method: Software version 4.0.13 produced by BEL Japan, Inc., was used for measurement.

Pore volume of activated carbon of 50 nm to 1 μm: Pore-size-distribution measuring apparatus (AUTOPORE IV) of Shimadzu Corporation was used for measurement under mercury pressure ranging from 1.35 psia to 30,000 psia.

Measurement of Raman spectrum: Raman spectrophotometer Holoprobe 532 produced by Kaiser Optical Systems, Inc was used (Excitation light: $Nd^{3+}$ of 532 nm, YAG laser, Detector: charge coupled device, Laser power: 4 mW to 10 mW), and the half-value width of a D-band peak in the vicinity of 1360 $cm^{-1}$ and the half-value width of a G-band peak in the vicinity of 1580 $cm^{-1}$ were calculated.

Butane working capacity (BWC) that denotes evaporated-fuel-gas adsorptivity: Measurement was performed according to ASTM-D5228 (hereinafter, abbreviated as "BWC/ASTM"). A BWC of 10 g/dL or more, preferably 13 g/dL or more, is practical for a canister.

Example 1

100 parts by weight of anthracite coal powder (0 crucible swelling number, 85% by weight fixed carbon content) whose ash content obtained by water washing was 2.5% by weight was mixed with 10 parts by weight of pitch and 25 parts by weight of coal tar. The resulting mixture was molded into cylindrical pellets each of which is 3 mm in diameter and 3 to 10 mm in length by use of a ring type pelleter produced by Ueda Steel Co., Ltd. These pellets were used as the raw material of activated carbon. The raw material was carbonized by being heated to 750° C. for three hours.

Thereafter, the carbonized material was heated to 800° C. for five hours under the atmosphere of mixed gas consisting of 10% by volume carbon dioxide and 70% by volume nitrogen containing a 20% by volume water vapor, and continuously underwent the activation process for twenty hours without changes. Thereafter, the material was further heated to 980° C., and continuously underwent the activation process for twenty-four hours without changes. As a result, activated carbon was obtained (Sample 1).

In Sample 1, Raman spectroscopy was performed, and the specific surface area according to the BET method (multipoint method), the pore diameter, the pore volume, and the packing density according to the CI method were measured. The results are shown in Table 1. The BWC/ASTM of Sample 1 was 17.0.

Example 2

The material that had been molded and carbonized in the same way as in Example 1 was activated at 800° C. for 20 hours under the same mixed gas atmosphere as in Example 1. Thereafter, the material was further heated to 980° C., and continuously underwent the activation process for 18 hours. As a result, granular activated carbon was obtained (Sample 2). Physical properties of Sample 2 are shown in Table 1. The BWC/ASTM of Sample 2 was 15.0.

Example 3

The material that had been molded and carbonized in the same way as in Example 1 was activated at 800° C. for 20 hours under the same mixed gas atmosphere as in Example 1. Thereafter, the material was further heated to 980° C., and continuously underwent the activation process for 12 hours. As a result, granular activated carbon was obtained (Sample 3). Physical properties of Sample 3 are shown in Table 1. The BWC/ASTM of Sample 3 was 13.0.

Comparative Example 1

The BWC/ASTM of wood-based activated carbon BAX1100 (Sample 4) of Westvaco Corporation which is wood-based granular activated carbon made by phosphoric acid activation was 11.2. Physical properties of Sample 4 are shown in Table 1.

Comparative Example 2

The BWC/ASTM of wood-based activated carbon BAX1500 (Sample 5) of Westvaco Corporation which is wood-based granular activated carbon made by phosphoric acid activation was 15.1. Physical properties of Sample 5 are shown in Table 1.

Comparative Example 3

The BWC/ASTM of wood-based activated carbon FX1135 (Sample 6) of PICA COMPANY, which is made by phosphoric acid activation, was 10.8. Physical properties of Sample 6 are shown in Table 1.

Example 4

Non-caking coal powder (0 crucible swelling number, 75% by weight fixed carbon content) whose ash content was set at 2.7% by weight by water washing was prepared. This non-caking coal powder was mixed with coconut-shell carbonaceous material powder whose ash content was set at 0.9% by weight by water washing in the same way at the ratio of 80 parts by weight to 20 parts by weight. The resulting carbonaceous-material mixture was molded carbonized, and activated in the same way as in Example 1. As a result, granular activated carbon was obtained (Sample 7). Physical properties of Sample 7 are shown in Table 1.

It is apparent from the results shown in Table 1 that the activated carbon of the present invention is superior in adsorptivity and in mechanical strength, and has a high packing density.

TABLE 1

|  | Example 1 Sample 1 | Example 2 Sample 2 | Example 3 Sample 3 | Comparative Example 1 Sample 4 | Comparative Example 2 Sample 5 | Comparative Example 3 Sample 6 | Example 4 Sample 7 |
|---|---|---|---|---|---|---|---|
| BET specific surface ($m^2/g$) | 1470 | 1340 | 1120 | 1150 | 1830 | 1730 | 1530 |
| Desorption-side specific surface area (CI method) ($m^2/g$) | 1700 | 1240 | 1140 | 760 | 1400 | 1190 | 1500 |
| Desorption-side pore volume (CI method) (mL/g) | 1.18 | 0.84 | 0.81 | 0.71 | 1.20 | 1.13 | 1.19 |
| Desorption-side pore volume in a pore diameter of 1.9 to 4 nm (CI method) (mL/g) | 1.08 | 0.76 | 0.69 | 0.38 | 0.76 | 0.56 | 1.05 |
| D-band half-value width ($cm^{-1}$) | 95.1 | 88.5 | 85.2 | 223 | 236 | 216 | 102 |

TABLE 1-continued

|  | Example 1 Sample 1 | Example 2 Sample 2 | Example 3 Sample 3 | Comparative Example 1 Sample 4 | Comparative Example 2 Sample 5 | Comparative Example 3 Sample 6 | Example 4 Sample 7 |
|---|---|---|---|---|---|---|---|
| G-band half-value width ($cm^{-1}$) | 85.2 | 68.9 | 54.5 | 110 | 125 | 105 | 91.5 |
| Pore volume in a pore diameter of 50 nm to 1 μm (mL/g) | 0.237 | 0.227 | 0.152 | 0.208 | 0.347 | 0.556 | 0.218 |
| packing density (mL/g) | 0.32 | 0.35 | 0.37 | 0.36 | 0.30 | 0.23 | 0.31 |
| BWC/ASTM (g/dL) | 17.0 | 15.0 | 13.0 | 11.2 | 15.1 | 10.8 | 16.8 |

Example 5

6.4 mL of myristyl alcohol (38° C. in melting point, 210 mJ/mg in latent heat of melting) in a molten state, which is produced by Kao Corporation, was injected into a 7.1 mL bag-like container (2.6 mm in thickness, 45 mm in length, and 60 mm in width) made of a film having a laminated structure with a thickness of 80 μm with the five layers of PET/PE/Al/PE/PET. Thereafter, the bag-like container was thermally sealed up, and was coagulated while being left at rest on a flat plate so that the thickness became uniform. Five sheets of latent heat storage mediums obtained in this way were disposed in a vertical direction at equal intervals of 10 mm on the bottom face of a vinyl-chloride-made canister which is 63 mm square side, 300 mm in height (252 mm in effective filling height) and 1000 mL in filling volume as shown in FIG. 1. Kuraraycoal 3GX of Kuraray Chemical Co., Ltd., serving as an adsorptive material was packed to the same height as the container around the latent heat storage mediums. This operation was repeatedly performed in sequence. The total filling volume came to 1000 mL by forming a five-stage structure in total. The content rate of the latent heat storage mediums in the evaporated fuel gas adsorbent was 30.1% by weight.

A canister was placed in an incubator having a temperature of 25° C., and was left at rest until the internal temperature thereof became stable. The initial weight (1a) thereof was measured. Thereafter, n-butane whose purity is 99% or more was allowed to flow therethrough at a flow rate of 1 L/minute upwardly so as to be adsorbed thereby. When the exit concentration reached 3000 ppm, the supply of n-butane was stopped, and the weight (W) of the canister was measured. An increase (W-1a) from the initial weight (1a) was regarded as an adsorption amount.

The canister was again placed in the incubator having a temperature of 25° C., and was left at rest for 5 minutes. Thereafter, air was allowed to flow therethrough downwardly at a flow rate of 15 L/minute for 20 minutes. 300 liters of air in total was allowed to flow therethrough, so that n-butane was purged. After the purging operation, the weight (1b) thereof was measured. A difference between the weight (W), which was measured after the adsorption, and the weight (1b), which was measured after the purge, was regarded as a desorption amount (W-1b). This adsorbing/purging operation was repeatedly performed six times. BWC was calculated according to the following equation on the condition that the average value of an adsorption amount and a desorption amount measured in the last 5th and 6th operations is an n-butane working capacity (BWC). The BWC was 79 g/L. It is understood that the capacity was improved by 40% in comparison with a case in which the BWC measured in the canister filled with only the activated carbon 3GX was 56.5 g/L.

$$BWC=[(W\text{-}5a)+(W\text{-}5b)+(W\text{-}6a)+(W\text{-}6b)]/4$$

Examples 6 to 11 and
Comparative Examples 4 and 5

In Example 5, the thickness of the film forming the container was set at 80 μm. The latent-heat storage material, the container material, the container-to-container distance, and the arrangement of latent heat storage mediums were executed under the conditions shown in Table 2. Paraffin produced by Katayama Chemical Co., Ltd., (40 to 42° C. in melting point and 143 mJ/mg in latent heat of melting) was used as the paraffin. Palmityl alcohol produced by Kao Corporation (48 to 51° C. in melting point and 264 mJ/mg in latent heat of melting) was used as the palmityl alcohol. The filling rate in a molten state of the latent-heat storage material was set at 90% by volume in every example. The content rate of the latent heat storage medium in the evaporated fuel gas adsorbent was 30.1% by weight in every example. The results are shown in Table 2.

Comparative Example 6

7.6 mL of molten myristyl alcohol, which is the same as in Example 5, was injected into an inflexible, cylindrical PP-made container that is 1.5 mm in thickness, 19.0 mm in outer diameter, 45 mm in height and 8.4 mL in internal volume. After having been cooled, the container was covered with a PP-made lid, and was sealed up with an adhesive. Four thus-formed cylindrical containers each of which contains a latent-heat storage material were arranged in the same canister as in Example 5 at equal intervals of 12.5 mm in vertically erected form. The canister was filled with the same activated carbon as in Example 5 therearound. The BWC was measured according to the same method as in Example 5, and, as a result, was 62.0 g/L.

Comparative Example 7

17.3 mL of molten paraffin having a melting point of 40 to 42° C. was injected into an inflexible, cuboidal PVC-made container that is 1.5 mm in wall thickness, 11.0 min thickness, 60 min width, 45 min height, and 19.2 mL in internal volume. After having been cooled the container was covered with a PVC-made lid, and was sealed up with an adhesive. Two thus-formed cuboidal containers each of which contains a latent-heat storage material were arranged in the same canister as in Example 5 at equal intervals of 20.5 mm in vertically erected form. The canister was filled with the same activated carbon as in Example 5 therearound. The BWC was measured according to the same method as in Example 5, and, as a result, was 59.2 g/L.

Example 12

11.1 mL of molten palmityl alcohol produced by Kao Corporation was injected into a 12.3 mL bag-like container that is 3.3 mm in thickness, 75 mm in length, and 50 mm in width and that is made of a PE film having a thickness of 80 μm. Thereafter, the container was thermally sealed up, and was coagulated so that the thickness became uniform while being left at rest on a flat plate (see reference numeral 13 in FIG. 4 and FIG. 5). 21.4 mL of the same molten palmityl alcohol as above was injected into a 23.8 mL bag-like container that is 3.3 mm in thickness, 240 mm in length (height), and 30 mm in width in the same way as above, and was coagulated so that the thickness became uniform in the same way as above (see reference numeral 14 in FIG. 4 and FIG. 5). Latent heat storage mediums obtained in this way were disposed in the same canister as in Example 5 that has a filling volume of 1000 mL so that the distance between the latent heat storage mediums 13 and 14 was 6 mm and so that the distance between the latent heat storage mediums 14 and 14 was 15 mm as shown in FIG. 4 and FIG. 5. Kuraraycoal 3GX of Kuraray Chemical Co., Ltd., serving as an adsorptive material was packed around the latent heat storage mediums so that the latent heat storage mediums were buried thereunder. The content rate of the latent heat storage mediums in the evaporated fuel gas adsorbent was 25.4% by weight. Table 2 shows BWCs measured according to the same method as in Example 5.

tainer was thermally sealed up, and was coagulated while being left at rest on a flat plate so that the thickness became uniform. This was used as a latent heat storage medium A. Ten 11.3 mL bag-like containers each of which is 2.6 mm in thickness, 72 mm in length (height), and 60 mm in width were prepared in the same manner as above. 10.2 mL of molten myristyl alcohol of Kao Corporation was injected into each of the 11.3 mL bag-like containers thus producing latent heat storage mediums B and C in the same way.

These containers were arranged in a filling volume of 1000 mL, which is the same as in Example 5, so that the distance between the latent heat storage mediums A and A was 10.1 mm, the distance between the latent heat storage mediums B and B was 8.9 mm, and the distance between the latent heat storage mediums C and C was 8.9 mm and so that the distance between the latent heat storage medium A and the inner wall of the evaporated fuel gas trapping apparatus was 8.1 mm, the distance between the latent heat storage medium B and the inner wall of the evaporated fuel gas trapping apparatus was 7.1 mm, and the distance of the latent heat storage medium C and the inner wall of the evaporated fuel gas trapping apparatus was 7.1 mm. Further, h1 and h2 were set at 25 mm and 10 mm, respectively, and Kuraraycoal 3GX of Kuraray Chemical Co., Ltd., serving as an adsorptive material was packed therearound up to the height H so that the whole of the latent heat storage mediums A to C was buried under the adsorptive material. The content rate of the latent heat storage mediums in the evaporated fuel gas adsorbent was 24.9% by weight. Table 3 shows the BWC measured according to the same method as in Example 5.

TABLE 2

| | Latent-heat storage material | Container material | Film thickness (mm) | Container-to-container distance (mm) | Container arrangement | BWC (g/L) |
|---|---|---|---|---|---|---|
| Example 5 | Myristyl alcohol | Al laminate | 2.6 | 10.0 | 5 sheets × 5 stages (25 sheets in total) | 79.0 |
| Example 6 | Myristyl alcohol | Al laminate | 4.2 | 16.8 | 3 sheets × 5 stages (15 sheets in total) | 75.5 |
| Example 7 | Myristyl alcohol | Al laminate | 2.1 | 10.5 | 5 sheets × 5 stages (25 sheets in total) | 75.7 |
| Example 8 | Myristyl alcohol | Al laminate | 3.0 | 17.8 | 3 sheets × 5 stages (15 sheets in total) | 73.4 |
| Example 9 | Myristyl alcohol | PP | 3.0 | 12.0 | One volute latent heat storage medium | 76.5 |
| Example 10 | Paraffin | PE | 2.1 | 10.5 | 5 sheets × 5 stages (25 sheets in total) | 70.7 |
| Example 11 | Palmityl alcohol | PP | 4.2 | 16.8 | 3 sheets × 5 stages (15 sheets in total) | 69.6 |
| Example 12 | Palmityl alcohol | PE | 3.3 | 6.0 15.0 | 2 sheets × 3 stages + 3 sheets × 1 stage (9 sheets in total) | 71.5 |
| Comparative Example 4 | Myristyl alcohol | Al laminate | 20.2 | 42.8 | One volute latent heat storage medium | 53.5 |
| Comparative Example 5 | Myristyl alcohol | Al laminate | 2.1 | 29.4 | 3 sheets × 5 stages (15 sheets in total) | 61.5 |
| Comparative Example 6 | Myristyl alcohol | PP | 19.0 | 12.5 | 4 cylinders × 5 stages (20 cylinders in total) | 62.0 |
| Comparative Example 7 | Paraffin | PVC | 11.0 | 20.5 | 2 sheets × 5 stages (10 sheets in total) | 59.2 |

Example 13 mL of molten n-octadecane (28.2° C. in melting point) produced by Tokyo Chemical Industry Co. Ltd. was injected into a 5.6 mL bag-like container (1.3 mm in thickness 72 mm in length (height) and 60 mm in width) made of a film having a laminated structure with a thickness of 80 μm with the five layers of PET/PE/Al/PE/PET. Thereafter, the bag-like con-

Example 14

5.1 mL of molten myristyl alcohol of Kao Corporation was injected into a 5.6 mL bag-like container (1.3 mm in thickness, 72 mm in length (height), and 60 mm in width) made of a film having a laminated structure with a thickness of 80 μm with the five layers of PET/PE/Al/PE/PET. Thereafter, the bag-like container was thermally sealed up, and was coagulated while being left at rest on a flat plate so that the thickness became uniform. This was used as a latent heat storage medium A. In the same manner as above, 7.8 mL of molten myristyl alcohol that is the same as above was injected into an 8.7 mL bag-like container that is 2.0 in thickness, 72 in length (height), and 60 mm width, thus producing a latent heat storage medium B in the same way. Further, 10.2 mL of molten myristyl alcohol that is the same as above was injected into a 11.2 mL bag-like container that is 2.6 in thickness, 72 mm in length (height), and 60 mm in width, thus producing a latent heat storage medium C in the same way.

These latent heat storage mediums were arranged in a canister having a filling volume of 1000 mL, which is the same as in Example 5, so that the distance between the latent heat storage mediums A and A was 10.1 mm, the distance between the latent heat storage mediums B and B was 9.5 mm, and the distance between the latent heat storage mediums C and C was 8.9 mm and so that the distance between the latent heat storage medium A and the inner wall of the evaporated fuel gas trapping apparatus was 8.1 mm, the distance between the latent heat storage medium B and the inner wall of the evaporated fuel gas trapping apparatus was 7.6 mm, and the distance of the latent heat storage medium C and the inner wall of the evaporated fuel gas trapping apparatus was 7.1 mm. Further, h1 and h2 were set at 25 mm and 10 mm respectively, and Kuraraycoal 3GX of Kuraray Chemical Co., Ltd., serving as an adsorptive material was packed therearound up to the height H so that the whole of the latent heat storage mediums A to C was buried under the adsorptive material. The content rate of the latent heat storage mediums in the evaporated fuel gas adsorbent was 22.8% by weight. Table 3 shows the BWC measured according to the same method as in Example 5.

Example 15

5.1 mL of molten myristyl alcohol of Kao Corporation was injected into a 5.6 mL bag-like container (1.3 mm in thickness 72 mm in length (height), and 60 mm in width) made of a film having a laminated structure with a thickness of 80 μm with the five layers of PET/PE/Al/PE/PET. Thereafter, the bag-like container was thermally sealed up, and was coagulated while being left at rest on a flat plate so that the thickness became uniform. This was used as a latent heat storage medium A. Ten 11.2 mL bag-like containers each of which is 2.6 min thickness, 72 mm in length (height), and 60 mm in width were prepared in the same manner as above. 10.2 mL of molten myristyl alcohol that is the same as above was injected into each of the bag-like containers, thus producing latent heat storage mediums B and C in the same way.

These latent heat storage mediums were arranged in a canister having a filling volume of 1000 mL which is the same as in Example 5, so that the distance between the latent heat storage mediums A and A was 9.4 mm, the distance between the latent heat storage mediums B and B was 8.3 mm, and the distance between the latent heat storage mediums C and C was 8.3 mm and so that the distance between the latent heat storage medium A and the inner wall of the evaporated fuel gas trapping apparatus was 9.4 mm, the distance between the latent heat storage medium B and the inner wall of the evaporated fuel gas trapping apparatus was 8.3 mm, and the distance of the latent heat storage medium C and the inner wall of the evaporated fuel gas trapping apparatus was 8.3 mm. Further, h1 and h2 were set at 30 mm and 5 mm, respectively, and Kuraraycoal 3GX of KurarayChemical Co., Ltd., serving as an adsorptive material was packed therearound up to the height H so that the whole of the latent heat storage mediums A to C was buried under the adsorptive material. The content rate of the latent heat storage mediums in the evaporated fuel gas adsorbent was 24.9% by weight Table 3 shows the BWC measured according to the same method as in Example 5.

Example 16

5.1 mL of molten n-octadecane (28.2° C. in melting point and 243 mJ/mg in latent heat of melting, which is also termed "latent heat of fusion") produced by Tokyo Chemical Industry Co., Ltd., was injected into a 5.6 mL bag-like container (1.3 mm in thickness, 72 mm in length (height), and 60 mm in width) made of a film having a laminated structure with a thickness of 80 μm with the five layers of PET/PE/Al/PE/PET. Thereafter, the bag-like container was thermally sealed up, and was coagulated while being left at rest on a flat plate so that the thickness became uniform. This was used as a latent heat storage medium A. In the same manner as above, 9.5 mL of molten myristyl alcohol of Kao Corporation was injected into a 10.4 mL bag-like container that is 2.4 mm in thickness, 72 mm in length (height) and 60 mm in width thus producing a latent heat storage medium B. Further, in the same manner as above, 10.2 mL of molten palmityl alcohol of Kao Corporation was injected into an 11.2 mL bag-like container that is 2.6 in thickness 72 mm in length (height) and 60 mm in width, thus producing a latent heat storage medium C.

These latent heat storage mediums were arranged in a canister having a filling volume of 1000 mL which is the same as in Example 5, so that the distance between the latent heat storage mediums A and A was 10.1 mm the distance between the latent heat storage mediums B and B was 9.1 mm, and the distance between the latent heat storage mediums C and C was 8.9 mm and so that the distance between the latent heat storage medium A and the inner wall of the evaporated fuel gas trapping apparatus was 8.1 mm, the distance between the latent heat storage medium B and the inner wall of the evaporated fuel gas trapping apparatus was 7.3 mm, and the distance of the latent heat storage medium C and the inner wall of the evaporated fuel gas trapping apparatus was 7.1 mm. Further, h1 and h2 were set at 25 mm and 10 mm, respectively and Kuraraycoal 3GX of KurarayChemical Co., Ltd. serving as an adsorptive material was packed therearound up to the height H so that the whole of the latent heat storage mediums A to C was buried under the adsorptive material. The content rate of the latent heat storage mediums in the evaporated fuel gas adsorbent was 24.3% by weight. Table 3 shows the BWC measured according to the same method as in Example 5.

TABLE 3

| | Latent-heat storage material | Container material | Container thickness (mm) | Container position (mm) T1 | T2 | h1 | h2 | Container arrangement | BWC (g/L) |
|---|---|---|---|---|---|---|---|---|---|
| Example 13 | A n-octadecane | Al laminate | tA | 1.3 | 10.1 | 8.1 | 25 | 10 | 5 sheets × 3 stages (15 sheets in | 80.2 |

TABLE 3-continued

| | | Latent-heat storage material | Container material | Container thickness | (mm) | T1 | T2 | h1 | h2 | Container arrangement | BWC (g/L) |
|---|---|---|---|---|---|---|---|---|---|---|---|
| | B | Myristyl alcohol | Al laminate | tB | 2.6 | 8.9 | 7.1 | | | total) | |
| | C | Myristyl alcohol | Al laminate | tC | 2.6 | 8.9 | 7.1 | | | | |
| Example 14 | A | Myristyl alcohol | Al laminate | tA | 1.3 | 10.1 | 8.1 | 25 | 10 | 5 sheets × 3 stages (15 sheets in total) | 79.7 |
| | B | Myristyl alcohol | Al laminate | tB | 2.0 | 9.5 | 7.6 | | | | |
| | C | Myristyl alcohol | Al laminate | tC | 2.6 | 8.9 | 7.1 | | | | |
| Example 15 | A | Myristyl alcohol | Al laminate | tA | 1.3 | 9.4 | 9.4 | 30 | 5 | 5 sheets × 3 stages (15 sheets in total) | 79.4 |
| | B | Myristyl alcohol | Al laminate | tB | 2.6 | 8.3 | 8.3 | | | | |
| | C | Myristyl alcohol | Al laminate | tC | 2.6 | 8.3 | 8.3 | | | | |
| Example 16 | A | n-octadecane | Al laminate | tA | 1.3 | 10.1 | 8.1 | 25 | 10 | 5 sheets × 3 stages (15 sheets in total) | 80.5 |
| | B | Myristyl alcohol | Al laminate | tB | 2.4 | 9.1 | 7.3 | | | | |
| | C | Palmityl alcohol | Al laminate | tC | 2.6 | 8.9 | 7.1 | | | | |

According to the evaporated fuel gas adsorbent of the present invention, a latent-heat storage material is encased in a container made of a flexible film, and these are used as a latent heat storage medium. Therefore, the entire latent heat storage medium is plastically deformable, and can efficiently come into contact with an adsorptive material participating in the adsorption and desorption of evaporated fuel gas. Therefore, heat relative to the adsorption and desorption can be effectively controlled and a size reduction can be achieved. As a result, the evaporated fuel gas adsorbent of the present invention can be suitably used in an evaporated fuel trapping apparatus, such as a canister. Additionally, the activated carbon of the present invention is excellent in the adsorptivity of an organic solvent vapor, especially, evaporated fuel gas, and is superior in packing density and in mechanical strength. Therefore, the activated carbon of the present invention is suitably used in a solvent recovery device or in an evaporated fuel gas trapping apparatus, such as a canister. Additionally, according to the process for producing the activated carbon of the present invention, the activated carbon can be produced industrially advantageously.

What is claimed is:

1. An evaporated fuel gas adsorbent comprising:
    latent heat storage mediums including containers each of which is made of a flexible film and in each of which a substance that absorbs or releases heat in response to a phase change is encased; and
    an adsorptive material,
wherein the container is made of a film having a laminated structure including an aluminum film.

2. The evaporated fuel gas adsorbent according to claim 1, wherein the substance that absorbs or releases heat in response to a phase change causes a phase change in a range from −10° C. to 100° C.

3. The evaporated fuel gas adsorbent according to claim 1, wherein a latent heat of fusion of the substance that absorbs or releases heat in response to a phase change is 20 mJ/mg or more.

4. The evaporated fuel gas adsorbent according to claim 1, wherein the adsorptive material is activated carbon in which:

a specific surface area calculated by a BET method (multipoint method) in a nitrogen adsorption isotherm determined from a nitrogen adsorption amount at liquid nitrogen temperature is 1000 to 2500 $m^2/g$;

a half-value width of a D-band peak in the vicinity of 1360 $cm^{-1}$ in Raman spectroscopic analysis is 120 $cm^{-1}$ or less; and a half-value width of a G-band peak in the vicinity of 1580 $cm^{-1}$ in Raman spectroscopic analysis is 100 $cm^{-1}$ or less.

5. The evaporated fuel gas adsorbent according to claim 1, wherein the adsorptive material is an activated carbon in which:
    a pore volume within a range from 1.9 nm to 4 nm in pore diameter calculated by a Cranston-Inkley method in a nitrogen desorption isotherm determined from a nitrogen adsorption amount at liquid nitrogen temperature is 0.6 mL/g or more;
    a volume of all pores is 0.8 mL/g or more; and
    a specific surface area is 1000 $m^2/g$ or more.

6. The evaporated fuel gas adsorbent according to claim 1, wherein the adsorptive material is an activated carbon in which a pore volume within a range from 50 nm to 1 μm in pore diameter measured by a mercury penetration method is 0.25 mL/g or less.

7. The evaporated fuel gas adsorbent according to claim 1, wherein the adsorptive material is an activated carbon at least 50% by weight of which is made from a coal-based carbonaceous material.

8. The evaporated fuel gas adsorbent according to claim 1, wherein the adsorptive material is activated carbon made from non-caking coal or anthracite coal whose fixed carbon content is 70% by weight or more.

9. An evaporated fuel gas trapping apparatus including the evaporated fuel gas adsorbent of claim 1.

10. The evaporated fuel gas trapping apparatus according to claim 9, wherein the latent heat storage mediums are used in three-stage form, each stage having the same height, and a thickness relationship thereamong is expressed as follows:

$$tA < tB \leq tC$$

where tA, tB, and tC are thicknesses in order from the an evaporated fuel gas supply opening.

11. The evaporated fuel gas trapping apparatus according to claim 9, wherein a melting-point relationship among the latent heat storage mediums is expressed as follows:

MA<MB<MC where MA, MB, and MC are melting-points in order from the an evaporated fuel gas supply opening.

12. Activated carbon in which:
   a specific surface area calculated by a BET method (multipoint method) in a nitrogen adsorption isotherm determined from a nitrogen adsorption amount at liquid nitrogen temperature is 1000 to 2500 $m^2/g$;
   a half-value width of a D-band peak in the neighborhood of 1360 $cm^{-1}$ in Raman spectroscopic analysis is 120 $cm^{-1}$ or less; and
   a half-value width of a G-band peak in the neighborhood of 1580 $cm^{-1}$ in Raman spectroscopic analysis is 100 $cm^{-1}$ or less.

13. The activated carbon according to claim 12, wherein:
   a pore volume within a range from 1.9 nm to 4 nm in pore diameter calculated by a Cranston-Inkley method in a nitrogen desorption isotherm determined from a nitrogen adsorption amount at liquid nitrogen temperature is 0.6 mL/g or more;
   a volume of all pores is 0.8 mL/g or more; and
   a specific surface area is 1000 $m^2/g$ or more.

14. The activated carbon according to claim 12, wherein a pore volume within a range from 50 nm to 1 μm in pore diameter measured by a mercury penetration method is 0.25 mL/g or less.

15. The activated carbon according to claim 12, having a packing density of 0.3 g/mL or more.

16. The activated carbon according to claim 12, at least 50% by weight or more of which is made from a coal-based carbonaceous material.

17. The activated carbon according to claim 12, being made from non-caking coal or anthracite coal whose fixed carbon content is 70% by weight or more.

* * * * *